United States Patent [19]

Zamboni

[11] Patent Number: 4,511,027
[45] Date of Patent: Apr. 16, 1985

[54] METHOD OF AND APPARATUS FOR THE HANDLING OF PRODUCTS BY OPERATIVE MEANS CARRIED IN CONTINUOUS MOVEMENT

[75] Inventor: Alderino Zamboni, Budrio, Italy

[73] Assignee: RISVIN - Ricerche e Sviluppo Industriale - S.r.l., Budrio, Italy

[21] Appl. No.: 433,552

[22] Filed: Oct. 8, 1982

[30] Foreign Application Priority Data

Oct. 23, 1981 [IT] Italy .................................. 3557 A/81

[51] Int. Cl.³ .............................................. B65G 29/00
[52] U.S. Cl. ..................................... 198/478; 198/479
[58] Field of Search ................. 198/478, 377, 479, 482

[56] References Cited

U.S. PATENT DOCUMENTS

| 1,846,009 | 2/1932 | White et al. | 198/478 |
| 1,887,211 | 11/1932 | Mortimer | 198/478 |
| 3,033,346 | 5/1962 | Gardiner | 198/478 |
| 3,096,869 | 7/1963 | Creed et al. | 198/377 |
| 3,330,400 | 7/1967 | Alexander | 198/478 |
| 3,469,670 | 9/1969 | Cartwright | 198/478 |
| 3,659,694 | 5/1972 | Harris | 198/479 |
| 3,776,343 | 12/1973 | Gouy | 198/478 |
| 3,834,522 | 9/1974 | Jackson | 198/478 |
| 3,995,745 | 12/1976 | Chambers | 198/377 |
| 4,283,973 | 8/1981 | Spencer | 198/479 |

FOREIGN PATENT DOCUMENTS

| 216643 | 11/1957 | Australia | 198/377 |
| 1019952 | 2/1966 | United Kingdom . | |
| 1316933 | 5/1973 | United Kingdom . | |
| 1483583 | 8/1977 | United Kingdom . | |

Primary Examiner—Joseph E. Valenza
Assistant Examiner—Daniel R. Alexander
Attorney, Agent, or Firm—Karl F. Ross; Herbert Dubno

[57] ABSTRACT

A method of and an apparatus for the handling of products or articles for the treatment of same by, for example, the carrying out upon them of specific operations of machining or processing, assembling, packing and the like through operative structure carried in continuous movement along a path of mixed form comprising rectilinear, spiral, circular and arcuate portions of whatever type, following one another and intercalated and at different velocities according to the type of operation to be carried out on the product.

10 Claims, 7 Drawing Figures

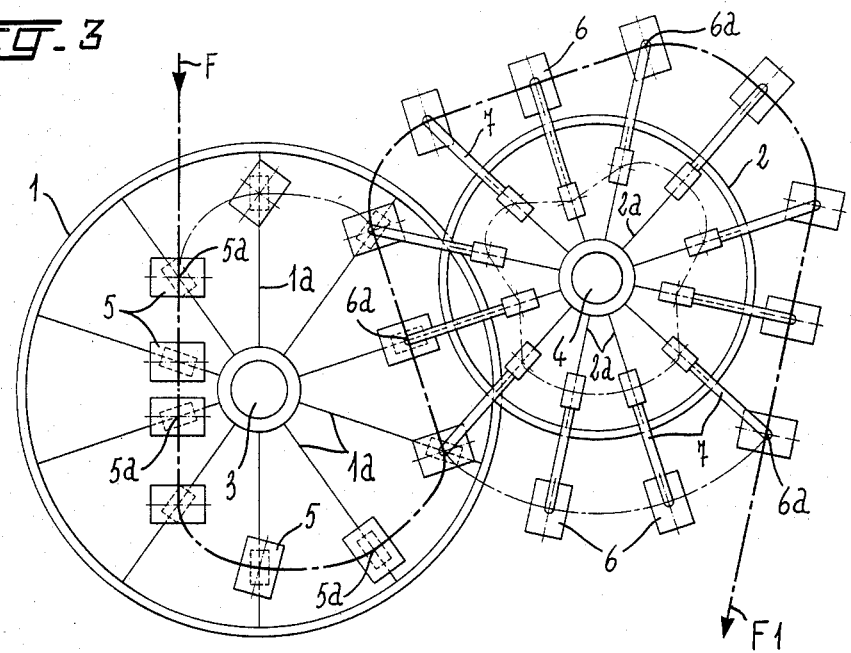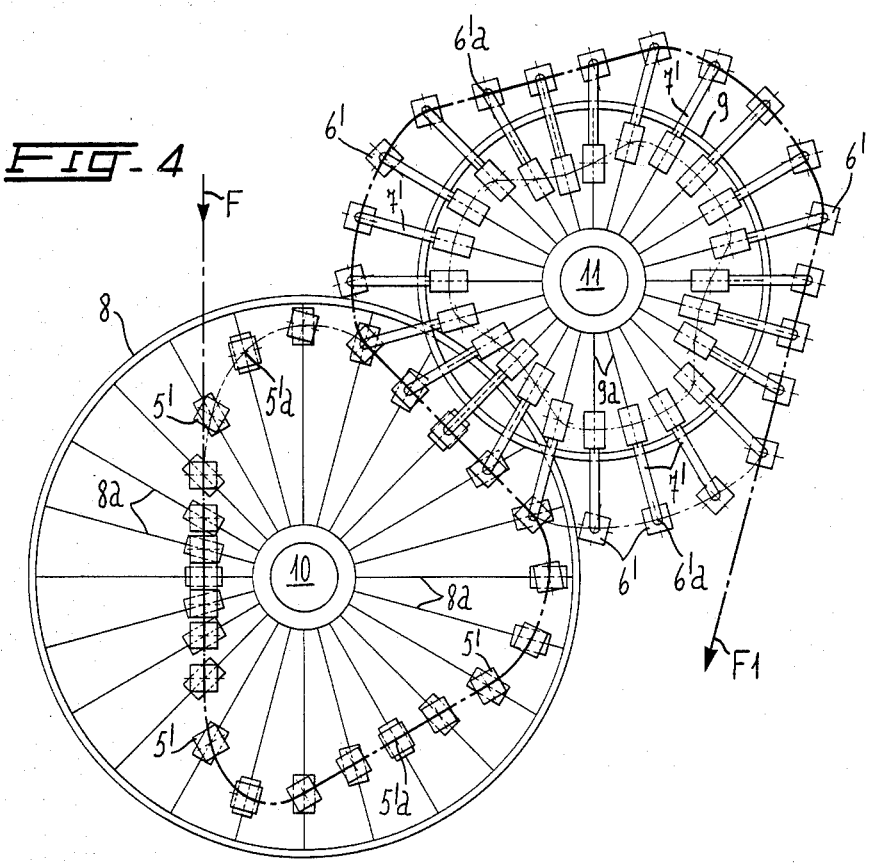

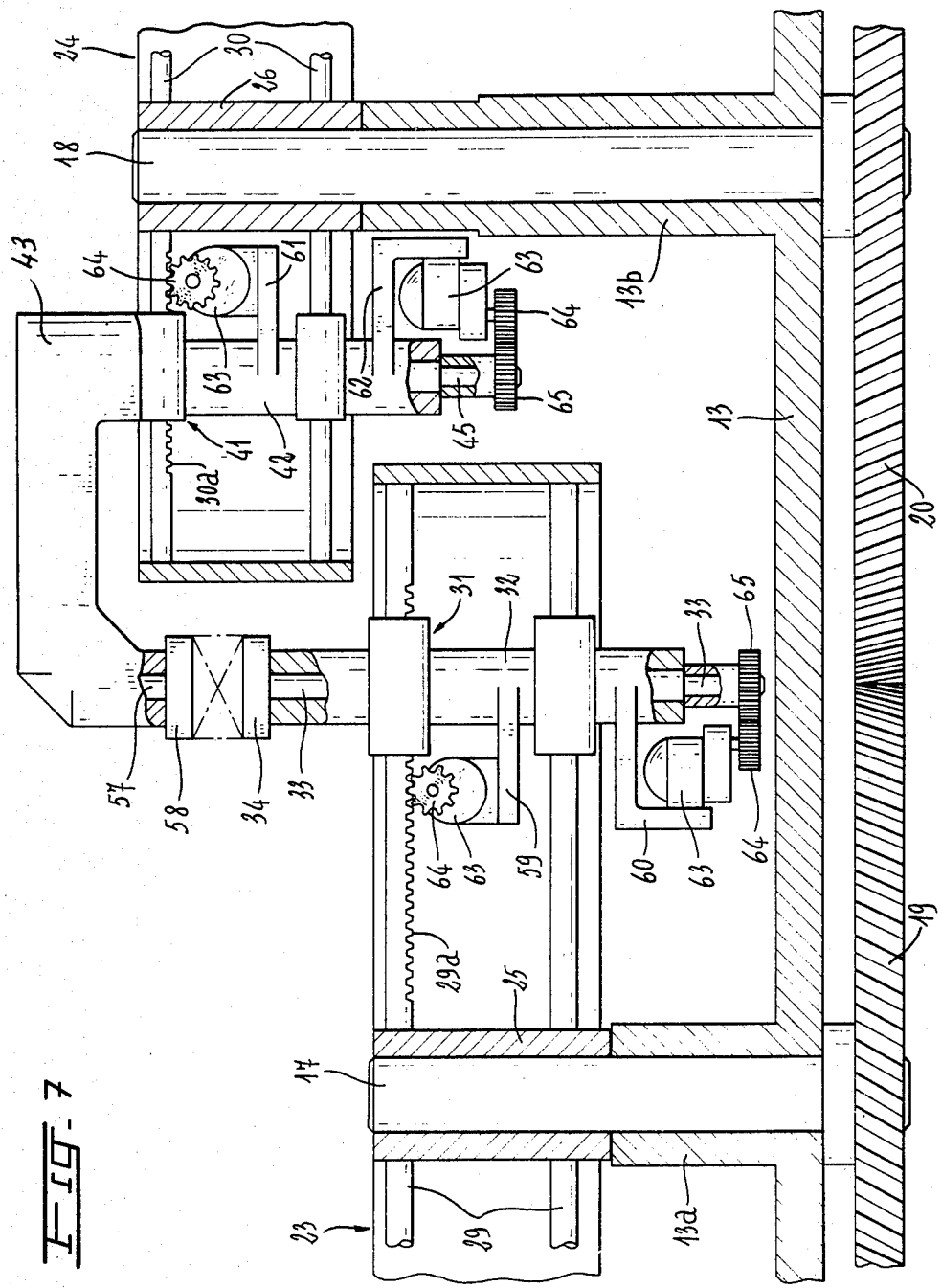

METHOD OF AND APPARATUS FOR THE HANDLING OF PRODUCTS BY OPERATIVE MEANS CARRIED IN CONTINUOUS MOVEMENT

FIELD OF THE INVENTION

The present invention relates to a method of and an apparatus for the handling of products by operative means carried in continuous movement.

BACKGROUND OF THE INVENTION

The handling of products or articles for the treatment of same by means of, for example, the carrying out upon them of specific operations of working, machining, processing, assembling, packing and the like is normally carried out by conveying said products or articles along a circular path for carrying out of operations by the use of operative means carried entirely or partly by conveying elements provided with an intermittent motion, that is with periods of advance alternating with periods of dwell, in coincidence with the last-named of which almost the totality of said operations and/or the passing or transferring of the products or articles themselves from one conveying element to another succeeding element are carried out.

With the handling devices designed in this way, that is comprising intermittently moving conveying elements for allowing the greater part of the aforementioned operations and/or the transfer of the products themselves from one conveying element to another to be carried out upon the products during the periods of rest of each interruption, the operating speed is of necessity somewhat limited and this clearly gives rise to greater production costs.

With the objective of increasing the unitary operating speed of the aforementioned handling devices for the purpose of clearly reducing the production costs of the products obtained and/or treated, many continuous movement devices have been proposed, but in practical reality these have been found to be none other than hybrid devices since at least during the phase of transference of the product to be treated from operative means of a preceding conveying element to operative means of a succeeding conveying element, the product is at rest in that having been released by the operative means of said preceding conveying element and then struck by the operative means of said succeeding conveying element for the purposes of control or taking-over, with possible damage to the product itself. There are also disadvantages in regard to the uniformity of the later phase of conveying, or because in all cases there is always a constant circular conveying velocity of the operative means, therefore a high velocity, even for the more delicate handling operations such as, for example, that of transferring or passing the product from one conveying element to another, and also for the still more delicate operation of controlling or taking-over the product itself and the various elements which can intervene in the handling, especially during the phase of feeding to said operative means of the respective conveying elements.

OBJECT OF THE INVENTION

It is the object of the present invention to provide a method of and an apparatus for the handling of products of operative means carried in continuous movement along a path of mixed form, comprising rectilinear, spiral, circular and arcuate portions of any type following one another and intercalated and at different velocities depending upon the type of operation to be carried out upon the product.

SUMMARY OF THE INVENTION

According to said method and said apparatus, in fact, the single products or articles of a succession of products or articles to be handled or to be treated are, for example, first carried at low velocity along a rectilinear portion of the path in order to be better controlled in their phase of feeding to the operative means and then, once they are under the control of said operative means, along an arcuate path at a gradually increasing velocity so as to separate them and subject them to specific operations, and then again along a rectilinear portion at a different velocity for a later operation, and then so on according to the number and type of operations to be carried out in relation to the type of product to be treated.

In this way it is clear that the possibility achieved of being able to carry out transfer or passing over operations of products or articles to be treated from operative means of one conveying element to operative means of another conveying element, for example along one of the rectilinear path portions even at a decelerating velocity, completely cancelling out any relative velocity, independently of the actual value of the conveying velocity.

The method according to the invention for the handling of products or articles for the treatment of same by, for example, the carrying out on them of specific operations of working, machining, processing, assembling, packing and the like through operative means carried in continuous movement is characterized in that, through said operative means, said products or articles to be treated are carried in continuous movement along a path having a mixed form comprising rectilinear, spiral, circular and arcuate portions of any type, following one another and intercalated and at different velocities according to the type of operation to be carried out on the product.

The apparatus according to this invention for the realization of said method comprises operative means having a support structure capable of being associated in a movable manner with one or more conveying elements in continuous movement and driving means for moving said operative means relative to the respective conveying element in order to cause said operative means to perform a continuous movement along a path of mixed form comprising rectilinear, spiral, circular and arcuate portions of any type, following one another and intercalated and at different velocities depending upon the type of operation to be carried out on the product.

According to the invention the conveying elements in continuous movement are preferably provided in the form of wheels with radial support guides, on which are slidably mounted said operative means having a support structure, with which are associated means for moving them along the respective radial support guide in order to move them away from and/or bring them nearer to the rotational axis of the corresponding conveying element in continuous movement in such a manner as to be entrained continuously along the aformentioned path comprising mixed portions and different velocities. The means for moving the operative means along the respective radial support guide can be provided, by way of example, of the common driving cam type, or individually by motors of the so-called step by step type, or by other equivalent means.

BRIEF DESCRIPTION OF THE DRAWINGS

In the attached drawing, there are illustrated purely by way of example and in a non-limiting context, some preferred embodiment of the present invention, and more specifically these show:

FIG. 3 a second example of said method;

FIG. 4 a different embodiment of said second example;

FIG. 5 a preferred embodiment of the apparatus, viewed in plan, for the realization of the method according to FIG. 3;

FIG. 6 a cross-section in elevation of the apparatus in FIG. 5; and

FIG. 7 an analogous cross-section in elevation of the apparatus shown in FIG. 6 with some structural variants.

DESCRIPTION OF THE PREFERRED EMBODIMENT

The aforementioned method according to the invention for the handling of products or articles for the treatment of same by, for example, the carrying out on them of specific operations of machining, processing, working, assembling, packing and the like, through operative means carried in continuous movement, consists in the carrying in continuous movement of said products or articles to be treated through said operative means along a path of mixed form, comprising rectilinear, spiral, circular and arcuate portions of any type in succession and intercalated and at different velocities, depending upon the type of operation to be carried out on the product.

For the practical realization of said method according to the operative phases shown as examples in FIGS. 1 to 4, the operative means intended for carrying the products to be treated along the path comprising mixed portions and at different velocities in accordance with the invention for treatment by, for example, the carrying out on them of specific operations of working, machining, processing, assembling, packing and the like, are schematically shown in said example figures in the form of blocks, while the conveying elements in continuous movement are schematically shown in the form of wheels having spokes by which these blocks are carried slidably guided.

Figure 1:
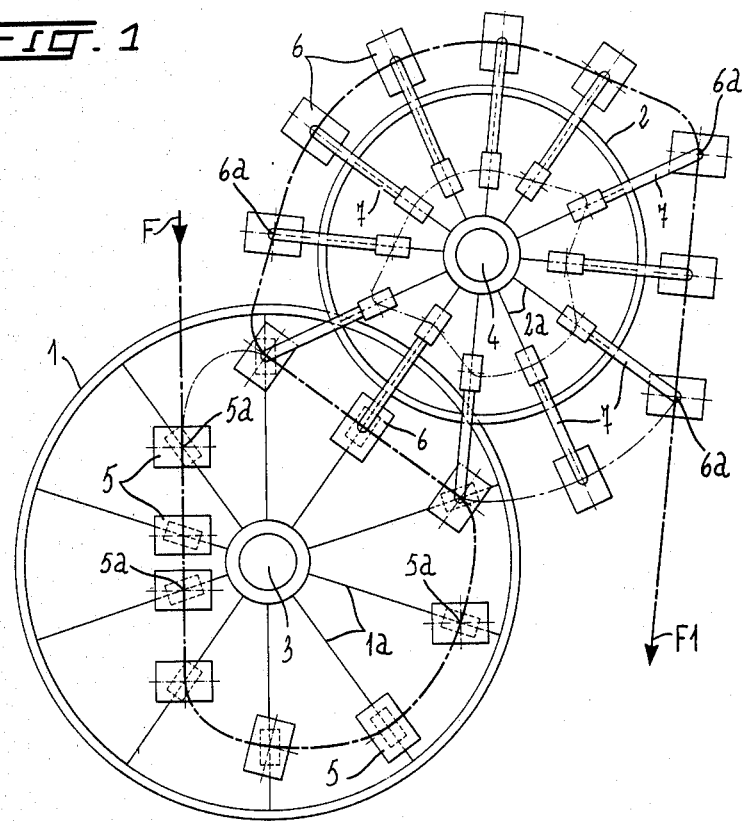
FIG. 1 schematically, a first example of the method intended for achieving the movement path according to this invention comprising portions of different forms and at different velocities.
Figure 2:
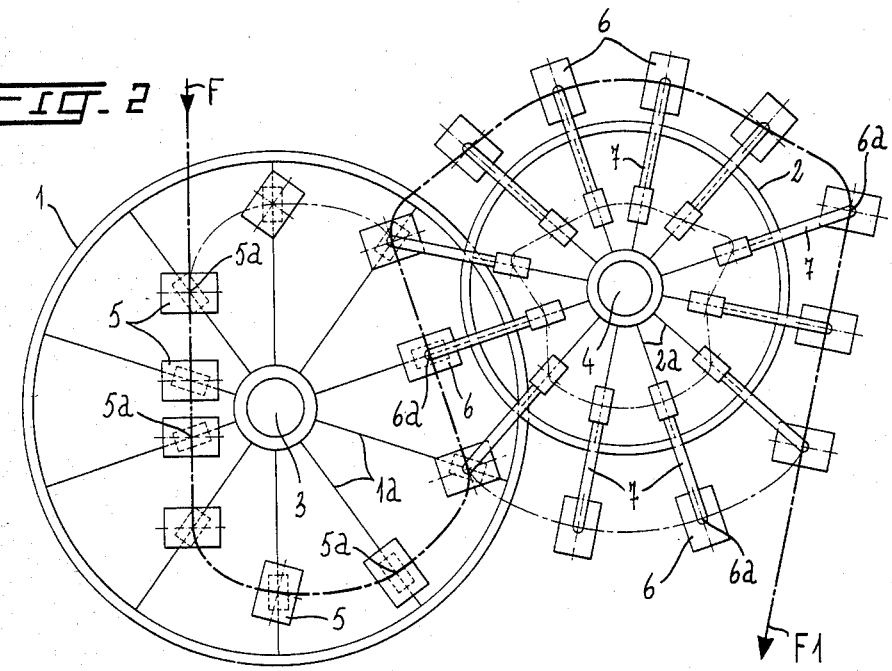
FIG. 2 a variant of said first example.

In the embodiments of the method according to FIGS. 1 to 3, two such continuously moving conveying elements are indicated in the form of spoked wheels 1 and 2, revolving in opposite directions about parallel axes 3 and 4. The spoked wheel 1 is equipped with ten spokes 1a and the spoked wheel 2 is equipped with twelve spokes 2a. One of said blocks, referenced 5, rotatable about a respective axis 5a parallel to the axes of rotation 3 and 4 of the spoked wheels 1 and 2, is slidably carried by each of the ten spokes 1a of the spoked wheel 1, while one of an analogous series of blocks 6 is slidably carried by each of the twelve spokes 2a of the spoked wheel 2. These latter blocks 6 are themselves also mounted rotatable about a respective axis 6a, parallel to said axes of rotation 3 and 4 of said spoked wheels 1 and 2, at the free end of a corresponding support arm 7 in turn mounted radially slidable along a respective spoke 2a of the spoked wheel 2.

In the embodiment of FIG. 4, two continuously moving conveying elements are provided in the form of spoked wheels 8 and 9, revolving in opposite directions about parallel axes 10 and 11. These spoked wheels 8 and 9 are each equipped with twenty-four spokes 8a and 9a respectively, by each of which there is slidably carried an equivalent, corresponding block 5' rotatable about a respective axis 5'a parallel to the axes 10 and 11 of counter-rotation of the two spoked wheels 8 and 9 and respectively 6' mounted rotatable about a respective axis 6'a parallel to said axes 10 and 11 of counter-rotation of the spoked wheels 8 and 9 at the free end of a respective arm 7' carried radially slidable along a corresponding spoke 9a of the spoked wheel 9.

According to the invention the ratio of rotation of the two pairs of respectively counter-rotating spoked wheels 1, 2 and 8, 9 is selected in such a manner that in one or more predetermined radial positions of the respective blocks 5, 6 and 5', 6', in combination with their determined respective radial movements imparted to them in the manner which will be explained in more detail later, they revolve in opposite senses with the same advance velocity.

The products of the assembly of products to be treated are carried in single succession, at equal distances one behind another, in proximity to the wheel 1 or to the wheel 8, in a manner which is already known, for example by means of a device of the type according to U.S. Pat. No. 3,155,221, and from there are transferred singly in succession, also in a way which is known, for example with the assistance of the same device referred to in the aforementioned U.S. Pat. No. 3,155,221, or by means of the device according to U.S. Pat. No. 3,747,737, to the single blocks 5 of the spoked wheel 1, or to the blocks 5' of the spoked wheel 8, moving in continuous rotation, (the products) advancing in aligned arrangement with constant orientation about the respective axes 5a or 5'a, one behind another in the direction of the arrow F at a velocity which is low there due to their short or small distance from the axis of rotation 3 or 10 of the respective wheel 1, 8.

The products thus transferred to the blocks 5 or 5', during the continuous revolution of the wheel 1, 8, and by means of the radial displacement of said blocks along the respective slide support spokes 1a, 8a of said spoked wheel 1, 8, are spaced apart one from another and raised to a higher velocity along the predetermined path of mixed form as defined above according to the number and type of operations to be carried out on the product to be treated.

A detail which is of extreme importance is the transference of the products from the wheels 1 and 8 to the respective associated wheel 2, 9, where the corresponding respective blocks 5, 6 and 5', 6' are moved together by said respective wheels along a rectilinear portion of path at the preselected velocity without any relative movement amongst themselves (see FIGS. 1 to 4).

When the passage or transference has taken place from the blocks 5, 5' of the wheels 1, 8 to the blocks 6, 6' of the wheels 2, 9, the products are carried by said blocks 6, 6' of the wheels 2, 9 along a predetermined path for further operations and then are either discharged in the direction of arrow F1 or transferred for further operations to another conveying wheel in a manner analogous to the foregoing for the transference from the wheels 1, 8 to the wheels 2, 9.

By way of example, as stated earlier, in FIG. 1 there has been illustrated for the wheel 1 a path for the respective blocks 5 comprising a first portion of rectilinear form at low velocity for feeding the products to the operative elements 5 themselves, followed by a second portion having some arcuate form at a greater velocity and by a third portion having a rectilinear form in common with the blocks 6 of the conveying wheel 2 of moderate velocity for the passing or transference of said products from said operative means 5 of the conveying wheel 1 to the operative means 6 of the conveying wheel 2. For said wheel 2, on the other hand, there has been illustrated a path for the respective blocks 6 comprising, in addition to said rectilinear path portion in common with the blocks 5 of the wheel 1, a second portion having a somewhat arcuate form at a higher velocity than that of said common portion of rectilinear form, followed by a third portion, again of rectilinear form, and at the same velocity as that of the common rectilinear portion with the wheel 1 for the phase of discharge of the treated products.

In the variant illustrated in FIG. 2, there has been shown a path analogous to that of FIG. 1 but with the portions of arcuate form being of consequently varied length as a function of the different radial disposition of the wheel 2 with respect to the wheel 1.

In the variant shown in FIG. 3, in which the arrangement of the wheels 1 and 2 is the same as that shown in FIG. 2, the path for the wheel 2 comprises a portion of rectilinear form intermediate between the portion of rectilinear form common to the wheels 1 and 2 and the discharge portion of the same wheel 2.

In the variant shown in FIG. 4, finally, in which the arrangement of the wheels 8 and 9 is substantially analogous to that shown in FIG. 1, the path for the wheel 9 is equivalent to that illustrated in FIG. 3.

Figures 5, 6:
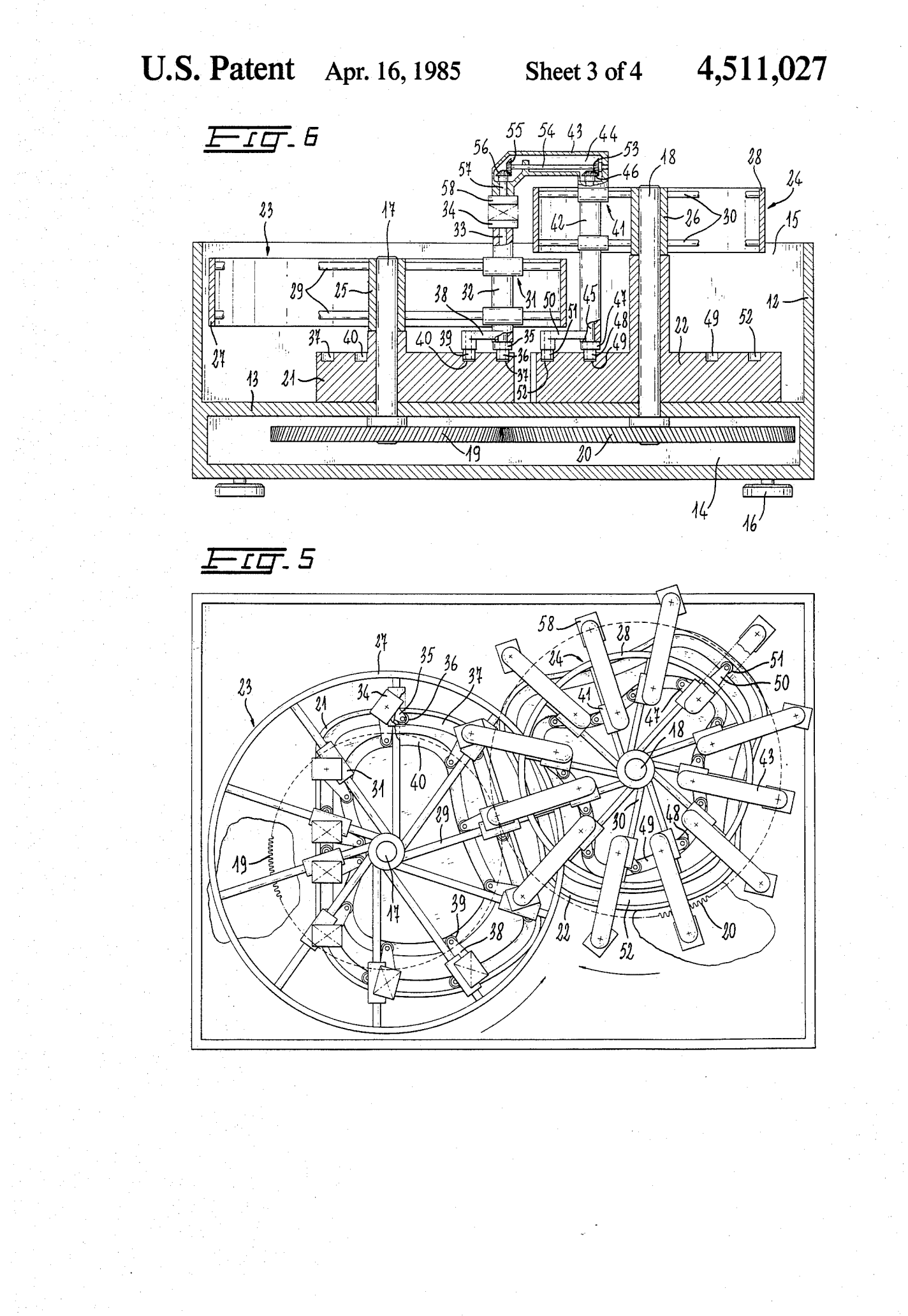

The apparatus according to this invention for carrying out the method described as example above with reference to FIGS. 1 to 4 is schematically illustrated in FIGS. 5 to 7 by way of a functional example for the automatic, practical realization of the method described above with reference to FIG. 3.

This functional apparatus shown as example consists essentially of a block or casing 12 in the form of a basin internally subdivided by a horizontal partition 13 into two superimposed hollow sections, a lower section 14 and upper section 15, and equipped with support feet 16. By this horizontal diaphragm 13 there are rotatably mounted, in a manner to be explained below, two vertical shafts 17 and 18 parallel to each other and projecting with their lower ends into the interior of the lower hollow section 14 and continuing with their upper ends upwards inside the upper hollow section 15.

On said lower end of the vertical shafts 17 and 18, within the lower hollow section 14, there is keyed respectively a toothed wheel 19 and 20. Said toothed wheels 19 and 20 are in engagement with each other and are motor-driven in some manner which is already known by means of a motor and reduction gear, not shown.

In the portion of said shafts 17 and 18 extending above the horizontal partition 13 in the interior of the hollow section 15, there is sleeved on each shaft a respective block 21 and 22, fixed in some manner which is already known on said horizontal diaphragm 13.

On the upper ends of the shafts 17 and 18 projecting above the respective blocks 21 and 22, a respective wheel 23 and 24 respectively is keyed on each shaft.

Each of said wheels 23 and 24 is composed of a hub 25 and 26 respectively for keying onto the respective shaft 17 and 18, of an external ring or rim 27 and 28, and of a series of superimposed spokes 29 and 30 for connecting between the respective hubs 25 and 26 and the corresponding rims 27 and 28.

The series of superimposed spokes 29 of the wheel 23 are provided ten in number and the series of superimposed spokes 30 of the wheel 24 are provided twelve in number, in conformity with the aforementioned FIG. 3.

On each of the ten series of two superimposed spokes 29 of the wheel 23 there is slidably mounted a slider 31 comprising a tubular portion 32 offset with respect to the vertical plane in which said two respective, superimposed slide spokes 29 are oriented and projecting a certain amount both above and below the spokes themselves. In said tubular portion 32, there is engaged freely rotatable a shaft 33, terminating at the top externally of the upper tubular portion 32 in a head 34, which embodies the aforementioned blocks 5 and 5' and to the lower end of which, projecting out from the lower tubular portion 32, there is fixed the end of a lever 35, on the other end of which is mounted an idling cam follower roller 36 engaging in a cam groove 37 formed in the fixed block 21 (see FIGS. 5 and 6). At the end of said lower tubular portion 32, by contrast, an arm 38 forms its head, by the free end of which an idling cam follower roller 39 is carried, engaging in a second cam groove 40 possessed by the same fixed block 21 (see again the aforementioned FIGS. 5 and 6).

On each of the twelve series of two superimposed spokes 30 of the wheel 24 there is slidably mounted a slider 41, itself also possessing, in a manner analogous to the slider 31 of the wheel 23, a tubular portion 42 offset with respect to the vertical plane in which said respective two superimposed slide spokes 30 are oriented, and extending for a certin distance both above and below the spokes themselves. With the upper tubular portion 42 there is associated an arm 43, internally hollow 44, and terminating at its free end in a portion returning vertically downwards and axially hollow. In said tubular portion 42 is engaged, freely rotatable, a shaft 45, on the upper end of which inside the cavity 44 of the arm 43 there is keyed a bevel gear 46, and to the lower end of which, projecting out of the lower tubular portion 42, there is fixed the end of a lever 47, by the other end of which is carried an idling cam follower roller 48 engaging in a cam groove 49 possessed by the fixed block 22 (see again said FIGS. 5 and 6). At the end of said lower tubular portion 42, by contrast, an arm 50 forms its head, by the free end of which is carried an idling cam follower roller 51 engaging in a second cam groove 52 possessed by the same fixed block 22. With the bevel gear wheel 46 there engages a bevel gear wheel 53, keyed on one end of a shaft 54 rotatably mounted by the arm 43 in the interior of its hollow space 44. On the other end of said shaft 54 there is keyed a bevel gear 55, in engagement with a bevel gear 56 keyed on the shaft 57 journalled in the bore of the vertically downwardly oriented portion of the arm 43 and possessing a head 58, which embodies the aforementioned blocks 6 and 6'.

The aforementioned heads 34 possessed by the shafts 33 associated with the sliders 31 of the wheel 23 and the heads 58 which kinematically constitute the end of the shafts 45 associated with the sliders 41 of the wheel 24, and embodying the aforementioned blocks 5, 5' and 6, 6' respectively which were described above as examples of the method according to this invention with reference to FIGS. 1 to 4, are identical in practive with the aforementioned operative means carried in continuous movement by the wheels 1, 2 and 8, 9 referred to in the aforementioned FIGS. 1 to 4. Such operative means in practice can be constituted of gripping means and/or working or machining means of any type suitable with regard to the type of operation to be carried out and the product to be treated, for example of pincer elements, of magnetic elements, etc., so constructed moreover as to be able to be oriented at least about their own axis parallel to the axis of revolution about which they are carried in continuous movement in conformity with the path comprising mixed portions according to this invention.

The structural variants shown in FIG. 7 with respect to the realization of the apparatus described above by way of example with reference to FIGS. 5 and 6 consist essentially in the equipping of the tubular portions 32 and 42 of the sliders 31 and 41 of the wheels 23 and 24 with two arms each 59, 60 and 61, 62 respectively, rather than with one arm each as envisaged in the embodiment according to said FIGS. 5 and 6, and in equipping the horizontal partition 13 with cylindrical vertical extensions, 13a and 13b comprising axial bores, extending upwards inside the hollow section 15 of the block 12, inside which bores are rotatably journalled the shafts 17 and 18. With each of said arms 59, 60 and 61, 62 there is associated a stepping motor-reduction gear 63 itself of a type already known, onto the take-off motor shaft of which is keyed a corresponding toothed pinion 64. One of said pinions 64 belonging to one of the two motor-reduction gears 63 forming part of each slider 31 and 41 of the wheels 23 and 24 respectively engages in a toothed rack 29a, 30a, comprised for example by the upper spoke 29, 30 with which the slider 31, 41 itself of said wheels 23, 24 respectively is associated. The other of said pinions 64 of each of the other two motor-reduction gears 63 engages, by contrast, with a corresponding toothed wheel 65 keyed to the lower end of the shaft 33 belonging to the slider 31 of the wheel 23, and of the shaft 45 belonging to the slider 41 of the wheel 24 respectively.

Remembering, from what has been stated above, that the ratio between the two toothed wheels 19 and 20 which entrain in continuous counter-rotating motion the two wheels 23 and 24 carrying the sliders 31 and 41 respectively, with which are associated the operative heads 34 and 58, is selected in such a manner that in one or more predetermined radial positions of said operative heads 34 and 58 in operative relationship to each other, in combination with determined radial movements of said sliders 31 and 41, these wheels counter-rotate with the same velocity, it will be easily understood that with the device described above by way of example with reference to FIGS. 5 and 6 and also FIG. 7, the method according to the invention, itself also described by way of example with reference to FIGS. 1 to 4, is realized in practice in an industrially automatic manner without any relative movement between the operative means themselves and/or the product itself.

The technical advance derived from the utilization on an industrial scale of the method and of the apparatus realized in accordance with the unique technical-practical solution according to this invention will be all the more easily understood when the technical-commercial unit production rates given for the machines of this type at present in use on the basis of a determined number of cycles per unit of time are considered. It is only necessary, indeed, to remember that with the method and with the apparatus which carries it out according to the invention in an automatic manner, the products to be treated are always carried in continuous movement even during the course of the respective treatment and that with such a method it has become possible to realize an apparatus equipped with a greater number of operative means, to understand that even merely with an equivalent number of operative cycles per unit of time a greater unitary productivity will be achieved. Clearly evident also is the conclusion that, by operating always continuously, however, and therefore without any kind of dwell of the products, it is always possible to increase such a number of cycles per unit of time and consequently the unitary productivity. Thus, for example, if the wheels with which are associated the operative means for achieving said known unitary production rates revolve at fifty revolutions per minute, it will still clearly be possible to increase said number of revolutions of the revolving wheels, still continuously according to the invention, thereby again increasing the respective unitary production.

With regard now to the radial movements of the sliders 31 and 41 where they are situated in operative coupling relationship along a portion of rectilinear form at equal velocity in their continuous rotational movement, it is helpful to remember that in the case where cams are used the work of defining the form of the actuating profile of said cams comes basically within the scope of the normal design work.

In the practical realization of the method and of the apparatus described above by way of example there will clearly enter also all those embodiments suggested by the technical-practical requirements arising from the range and scope of the invention in question and moreover in the accepted meaning of treatment of products carried in succession in continuous movement along a path of mixed form comprising rectilinear, spiral, circular and arcuate portions of any type, following one another and intercalated and at different velocities depending upon the type of operation to be carried out on the products themselves.

I claim:

1. A method of handling articles which comprises the steps of:

mounting said articles in succession upon a plurality of angularly equispaced holders on a first wheel rotatable about an axis by shifting said holders as said wheel rotates to ensure that said holders describe a linear path section during the mounting of said articles on said holders;

thereafter rotating said wheel to arcuately sweep said holders and said articles thereon along at least one further path section including at least one arcuate portion;

thereafter shifting said holders radially as said wheel continues to rotate about said axis while rotating said holders about respective holder axes parallel to the axis of said wheel to maintain a given orientation of said holders along a further linear path section;

rotating a second wheel about a second wheel axis parallel to but spaced from the first mentioned axis of the first mentioned wheel and radially displacing respective holders of said second wheel to align said holders of said second wheel with said holders of the first wheel along said further linear section while angularly displacing said holders of said second wheel about respective holder axes parallel to the axis of said second wheel to maintain a given orientation of said holders of said second wheel during movement along said further linear path section whereby said articles are transferred to said holders of said second wheel; and thereafter continuing to rotate said second wheel to displace said holders of said second wheel and the articles therein along still another path section including at least one curve.

2. An apparatus for the handling of articles comprising:
- a first wheel formed with a plurality of angularly equispaced first guides and rotatable about a first wheel axis;
- respective first holders generally radially displaceable along said guides, each of said holders being angularly displaceable about a respective holder axis parallel to the first wheel axis;
- a second wheel rotatable about a second wheel axis parallel to said first wheel axis and provided with a plurality of angularly equispaced generally radial second guides;
- respective holders displaceable along said guides and each rotatable about a respective holder axis parallel to said second wheel axis;
- means for continuously and synchronously rotating said wheels about the respective wheel axes in opposite senses whereby the holders of said wheels register for transfer of said articles between said wheels on a transfer section of an article path defined between said wheels; and
- means for controlling the displacement of said holders along said guides and the angular orientation of said holders about the respective holder axis to define a first generally linear section of said path by one wheel wherein said holders of said one wheel maintain a predetermined orientation for the mounting of said articles on the respective holders and said holders of both wheels define linear paths with a given and maintained orientation during transfer of said articles between the holders of said wheels, said path including arcuate sections along which said articles are carried by said wheels prior to and subsequent to transfer.

3. The apparatus defined in claim 2 wherein the means for controlling the angular displacement of said holders along said guides includes respective cams surrounding the respective wheel axis and cam followers connected with said guides and engaging said cams.

4. The apparatus defined in claim 3 wherein said means for controlling the angular orientation of said holders includes a further cam associated with each of said wheels and surrounding the respective wheel axis and a further cam follower connected with each of said holders and engaging said further cam.

5. The apparatus defined in claim 2 wherein said means for controlling the angular orientation of said holders includes a respective cam surrounding each of said wheel axes and a respective cam follower respectively connected with each holder and engaging the respective cam.

6. The apparatus defined in claim 2 wherein said means for controlling the displacement of said holders along said guides includes a rack and pinion mechanism for displacing the respective holders and a motor for driving the respective pinion of each of said mechanisms.

7. The apparatus defined in claim 6 wherein said means for controlling the angular orientation of said holders comprises a respective motor and gearing operatively connecting said motor to a respective holder.

8. The apparatus defined in claim 2 wherein the means for controlling the angular orientation of said holders includes a respective motor and gearing operatively connecting the respective motor to the respective holder.

9. The apparatus defined in claim 2 wherein the means for continuously and synchronously rotating said wheels includes a pair of meshing gears operatively connected to said wheels.

10. The apparatus defined in claim 2 wherein the holders of one of said wheels during registry of said holders for transfer of said articles between said wheels on said transfer section of said path overhang the holders of the other wheel, said apparatus further comprising bevel gearing connected to the holders of said one of said wheels for controlling the angular orientations of said holders about the respective holder axes.

* * * * *